(12) United States Patent
Wang et al.

(10) Patent No.: US 9,043,610 B2
(45) Date of Patent: May 26, 2015

(54) SYSTEMS AND METHODS FOR DATA SECURITY

(75) Inventors: Lan Wang, Cypress, TX (US);
Valiuddin Y. Ali, Cypress, TX (US);
Manuel Novoa, Cypress, TX (US);
Jennifer E. Rios, Spring, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 440 days.

(21) Appl. No.: 13/003,020

(22) PCT Filed: Jul. 7, 2008

(86) PCT No.: PCT/US2008/069334
§ 371 (c)(1),
(2), (4) Date: Jan. 7, 2011

(87) PCT Pub. No.: WO2010/005425
PCT Pub. Date: Jan. 14, 2010

(65) Prior Publication Data
US 2011/0126023 A1   May 26, 2011

(51) Int. Cl.
*G06F 21/78* (2013.01)
*G06F 21/62* (2013.01)

(52) U.S. Cl.
CPC .............. *G06F 21/78* (2013.01); *G06F 21/62* (2013.01)

(58) Field of Classification Search
None
See application file for complete search history.

(56) References Cited

U.S. PATENT DOCUMENTS

| | | | | |
|---|---|---|---|---|
| 5,757,920 A | * | 5/1998 | Misra et al. | 713/158 |
| 6,012,145 A | * | 1/2000 | Mathers et al. | 726/17 |
| 6,286,087 B1 | * | 9/2001 | Ito et al. | 711/164 |
| 6,400,823 B1 | | 6/2002 | Angelo | |
| 7,117,376 B2 | | 10/2006 | Grawrock | |
| 7,809,957 B2 | * | 10/2010 | Grawrock | 713/193 |
| 8,190,916 B1 | * | 5/2012 | Wang et al. | 713/193 |
| 2005/0182945 A1 | * | 8/2005 | Ali et al. | 713/182 |
| 2006/0259782 A1 | * | 11/2006 | Wang et al. | 713/189 |
| 2008/0155680 A1 | | 6/2008 | Guyot et al. | |
| 2009/0260055 A1 | * | 10/2009 | Parmar | 726/1 |

FOREIGN PATENT DOCUMENTS

| | | |
|---|---|---|
| JP | 2007-018050 | 1/2007 |
| JP | 2007-280216 | 10/2007 |
| JP | 2008-052704 | 3/2008 |
| JP | 2008-097575 | 4/2008 |
| JP | 2008-159059 | 7/2008 |
| JP | 2008-541264 | 11/2008 |
| JP | 2011-517389 | 6/2011 |

OTHER PUBLICATIONS

The International Search Report and the Written Opinion of the International Searching Authority for International application No. PCT/US2008/069334 dated Apr. 6, 2009, pp. 10.

* cited by examiner

*Primary Examiner* — Benjamin Lanier
(74) *Attorney, Agent, or Firm* — Hewlett-Packard Patent Department

(57) ABSTRACT

A system comprises a basic-input-output-system ("BIOS"), a disk drive, and a security system configured to prevent unauthenticated access to the disk drive. For each of at least two users out of a plurality of users, the BIOS authenticates the user based on the user's token. The BIOS also accesses secured data based on the authentication, and provides the secured data to the security system without input from the user.

21 Claims, 3 Drawing Sheets

100

SYSTEMS AND METHODS FOR DATA SECURITY

BACKGROUND

Many computers, especially in the commercial setting, have multiple users. However, many security systems for computers were designed for only single users. For example, a computer will prevent the disk drive from operating unless the user submits a valid password in order to strengthen security. Such a password is termed a "drive-lock password." Sharing the same drive-lock password among multiple users decreases the strength of the security, but use of multiple drive-lock passwords is not supported by the hard drive.

Compounding the problem, users are required to remember an increasing number of passwords: a basic-input-output-system ("BIOS") password, a power-on password, a drive-lock password, an operating system password, etc. As such, users tend to select memorable passwords, select the same password for each purpose, or both. This tendency further degrades the strength of security.

BRIEF DESCRIPTION OF THE DRAWINGS

For a detailed description of the embodiments of the present disclosure, reference will now be made to the accompanying drawings in which.

NOTATION AND NOMENCLATURE

Certain terms are used throughout the following claims and description to refer to particular system components. As one skilled in the art will appreciate, computer companies may refer to a component by different names. This document does not intend to distinguish between components that differ in name but not function. In the following discussion and in the claims, the terms "including" and "comprising" are used in an open-ended fashion, and thus are intended to mean "including, but not limited to . . . ". Also, the term "couple" or "couples" is intended to mean either an indirect or direct, electrical or optical, connection. Thus, if a first device couples to a second device, that connection may be through an indirect electrical connection via other devices and connections, through an direct optical connection, etc.

The term "token" is intended to mean "unique identifier." Thus, a token can be, but is not limited to being, a number, a string, a password, a combination of a username and password, a smart card, a combination of a smartcard and pin number, a fingerprint, a combination of fingerprints, etc.

The term "security system" is intended to mean "a manner of restricting access." For explanatory purposes, a security system is described in regards to restricting access to a disk drive. As such, the security system is a drive lock. However, any and all objects to which access can be restricted are within the scope of this disclosure.

DETAILED DESCRIPTION

The following discussion is directed to various embodiments of the invention. Although one or more of these embodiments may be preferred, the embodiments disclosed should not be interpreted, or otherwise used, as limiting the scope of the disclosure, including the claims, unless otherwise specified. In addition, one skilled in the art will understand that the following description has broad application, and the discussion of any embodiment is meant only to be exemplary of that embodiment, and not intended to intimate that the scope of the disclosure, including the claims, is limited to that embodiment.

Figure 1A:
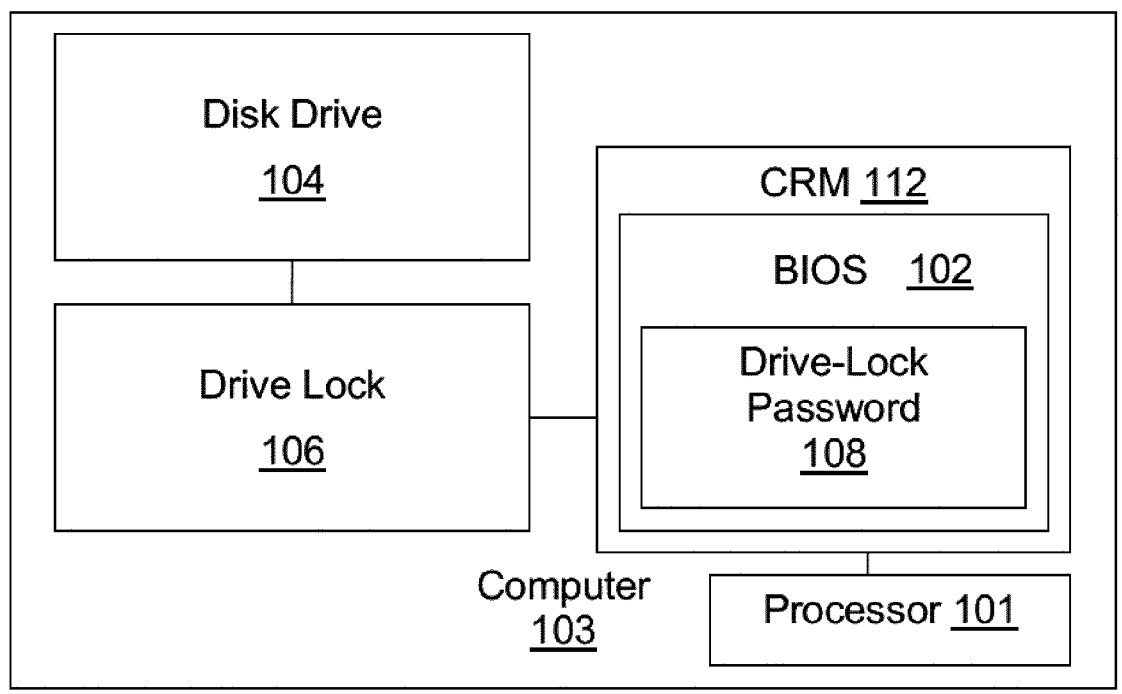
FIG. 1A shows a system of data security in accordance with at least one embodiment of the present disclosure.

In light of the obstacles outlined above, systems and methods for data security are disclosed. FIG. 1A shows a system 100 of data security in accordance with at least one embodiment. The system 100 comprises a computer 103, and the computer 103 comprises a processor 101 coupled to computer-readable medium 112. In various embodiments, the computer-readable medium 112 comprises volatile memory (e.g., random access memory, etc.), non-volatile storage (e.g., read only memory, Flash memory, CD ROM, etc.), and combinations thereof. The computer-readable medium 112 comprises software or firmware that is executed by the processor 101. One or more of the actions described herein are performed by the processor 101 during execution of the software or firmware.

Preferably, the computer-readable medium 112 comprises a basic-input-output-system ("BIOS") 102. However, any type of software or firmware is within the scope of this disclosure. Preferably, the computer 103 also comprises a disk drive 104 and a security system configured to prevent unauthenticated access to the disk drive 104. As illustrated, the security system is a drive lock 106. The disk drive 104 is preferably hardware that stores data. In at least one embodiment, the disk drive 104 is a non-volatile storage device that stores digitally encoded data on magnetic surfaces. The BIOS 102 is preferably firmware that activates when the computer 103 is powered on. In at least one embodiment, the BIOS 102 identifies and initiates component hardware, e.g. the disk drive 104, and prepares the computer 103 to be controlled by an operating system.

As illustrated, the security system is a drive lock 106 that prevents unauthenticated access to the disk drive 104. However, any manner of restricting access to any object is within the scope of this disclosure. The drive lock 106 can be hardware, software, or firmware. In at least one embodiment, the drive lock 106 allows access to the disk drive only upon presentation of the proper data; as illustrated, the data is a drive-lock password 108 stored in the BIOS 102. For example, the drive lock 106 prevents the disk in the disk drive 104 from spinning, and hence being read from or written to, until the drive-lock password 108 is presented. Preferably, due to the sensitive nature of data on the disk drive 104, security measures are in place to protect the drive-lock password 108 from being accessed by unauthenticated users.

Security may be strengthened by use of tokens. A token is preferably a unique identifier such as a number, a string, a password, a combination of a username and password, a smart card, a combination of a smartcard and pin number, a fingerprint, a combination of fingerprints, etc. Each user has a different token. In the case of a human finger used for a fingerprint, a payload of data is associated with the physical token. In the case of a smart card, the payload of data is read from the smart card itself. In the case of a password, the payload of data is the password itself or released by submitting the correct password. In at least one embodiment, the payload of data is used to decrypt a key necessary to access the drive-lock password 108. As such, the drive-lock password 108 is encrypted separately multiple times, once for each user. When a computer administrator registers the user to use the computer 103, the token is selected and the payload of data is known. If the user is the first user to be registered, i.e. authenticated by the BIOS 102 for the first time, the BIOS 102 creates the drive-lock password 108. Preferably, the BIOS 102 creates a strong password, e.g. long and random, because, as will be seen, the user need not remember the drive-lock password 108.

A hash of the token is then created; specifically a hash of the payload of data is created. A hash is the output of a hash function. A hash function is a "one way" transformation that produces a string of fixed length as output for a string of any length as input. The term "one way" means that for a given set of input, the output is singularly unique (no other combination of input should result in the same output), and given the output, the input should not be derivable. Here, the input to the hash function is the payload of data. Two examples of hash functions are the "MD5" and "SHA" hash functions. The MD5, or Message-Digest algorithm 5, hash function outputs a 128-bit hash typically expressed as a 32-character string of hexadecimal numbers. The SHA, or Secure Hash Algorithm, hash function has five variants. Each variant outputs a different size hash depending on the strength of security desired. However, any hash function is within the scope of this disclosure.

Preferably, the output of the hash function is suitable to use as an encryption key to encrypt the drive-lock password. Two examples of encryption are "AES" and "Triple DES." The AES, or Advanced Encryption Standard, encryption algorithm is a block cipher that uses a block of 128 bits and keys of 128, 192, or 256 bits. The Triple DES, or Triple Data Encryption Standard, is a block cipher that uses keys of 168 bits. However, any encryption type is within the scope of this disclosure. Preferably, the BIOS 102 uses symmetric encryption to encrypt the drive-lock password 108 using the hash of the token as the encryption key or a secret derived using the hash of the token. Additional security is also possible using a technique referred to as "salting," which adds additional data to the key and makes attempts at guessing the key more difficult. A property of symmetric encryption is that the decryption key is the same or trivially related to the encryption key. As such, knowledge of the encryption or decryption key will lead to knowledge of the drive-lock password. For explanatory purposes, the encryption and decryption keys will be considered to be identical.

Accordingly, after creation of the key, in at least one embodiment, the key is obfuscated and stored in the BIOS 102 along with the encrypted drive-lock password 108. Obfuscation involves making the key difficult to read or obtain, and any method of obfuscation is within the scope of this document. As such, if a user wishes to access the disk drive 104, the BIOS 102 requests the user's token and compares and/or correlates the token with known or stored data and/or values in order to authenticate the user. After successful authentication, e.g. the payload of data matches an entry in a database, the BIOS de-obfuscates the key by reversing the obfuscation process and uses the key to decrypt the drive-lock password 108. Finally, the drive lock 106 is presented the drive-lock password 106, and the disk drive 104 is accessible.

In another embodiment, only the encrypted drive-lock password 108 is stored while the key is deleted. After registration, if a user wishes to access the disk drive 104, the BIOS 102 preferably requests the user's token. The BIOS then computes the hash of the token; specifically a hash of the payload of data is created. The BIOS 102 then authenticates the user by using the hash as a key to decrypt the drive-lock password 108. Because the key is derived from the token, the drive-lock password 108 will not be accessible to users without the proper token. Once decrypted, the drive-lock password 108 is presented to drive lock 106 to gain accessibility to the disk drive 104. As such, security is further strengthened because key and the decrypted drive-lock password 108 are not stored anywhere on the computer 103, but are only transiently available.

In an another embodiment, the key, in encrypted or in clear state, is never stored itself, but is stored in an external token or platform with additional protection schemes (e.g., smart cards, USB disks, crypto tokens, etc.). As such, security is enhanced because users not only need "know the secret" to decrypt the key but must possess the medium (token) that holds the clear or encrypted key. Specifically, requiring both possession of particular knowledge as well as possession of a particular item increases security compared to requiring only the former or the latter.

In order for a second user to register, the first user, who is preferably a computer administrator, decrypts the drive-lock password 108 using the key generated from the first user's token. Next, the BIOS 102 encrypts the drive-lock password 108 using a second key based on the second user's token. As such, any number of users may use the computer 103 using the same drive-lock password 108 but different tokens.

In order to strengthen security, the encrypted drive-lock password 108 and/or key may be compressed before being stored in the BIOS 102. In order to further strengthen security, random or specifically known bits may be inserted into the encrypted drive-lock password 108 and/or key before storage in the BIOS 102. These additional random or specifically known bits are sometimes termed "salt."

Preferably, the drive-lock password 108 is presented to the drive lock 106 without input from the user. As such, the user need not take any action after presenting the user's token in order to make the disk drive 104 accessible. Preferably, authenticating the user, accessing the secured data, and providing the secured data to the drive lock 106 occurs during the power-on self-test ("POST") phase of computer operation. As such, users will not be required to supply a BIOS password, a power-on password, a drive-lock password, an operating system password, or any other token for any other function before being able to access the operating system. However, if desired, only one or a certain combination of tokens may be obviated.

If the drive-lock password 108 is encrypted for each user based on the user's token as described above, security is strengthened in several respects. First, a strong drive-lock password 108 may be generated by the BIOS 102 because the user need not remember the drive-lock password 108. Second, even though there is only one drive-lock password, for a computer accommodating multiple users, the multiple users need not share nor communicate their tokens with each other as they would a common drive-lock password. Third, the multiple users need not be aware of the existence of the drive-lock password 108. Fourth, in at least one embodiment, because the BIOS 102 stores the encrypted key, a disk drive 104 stolen from the computer 103 cannot be accessed by another computer.

Figure 1B:
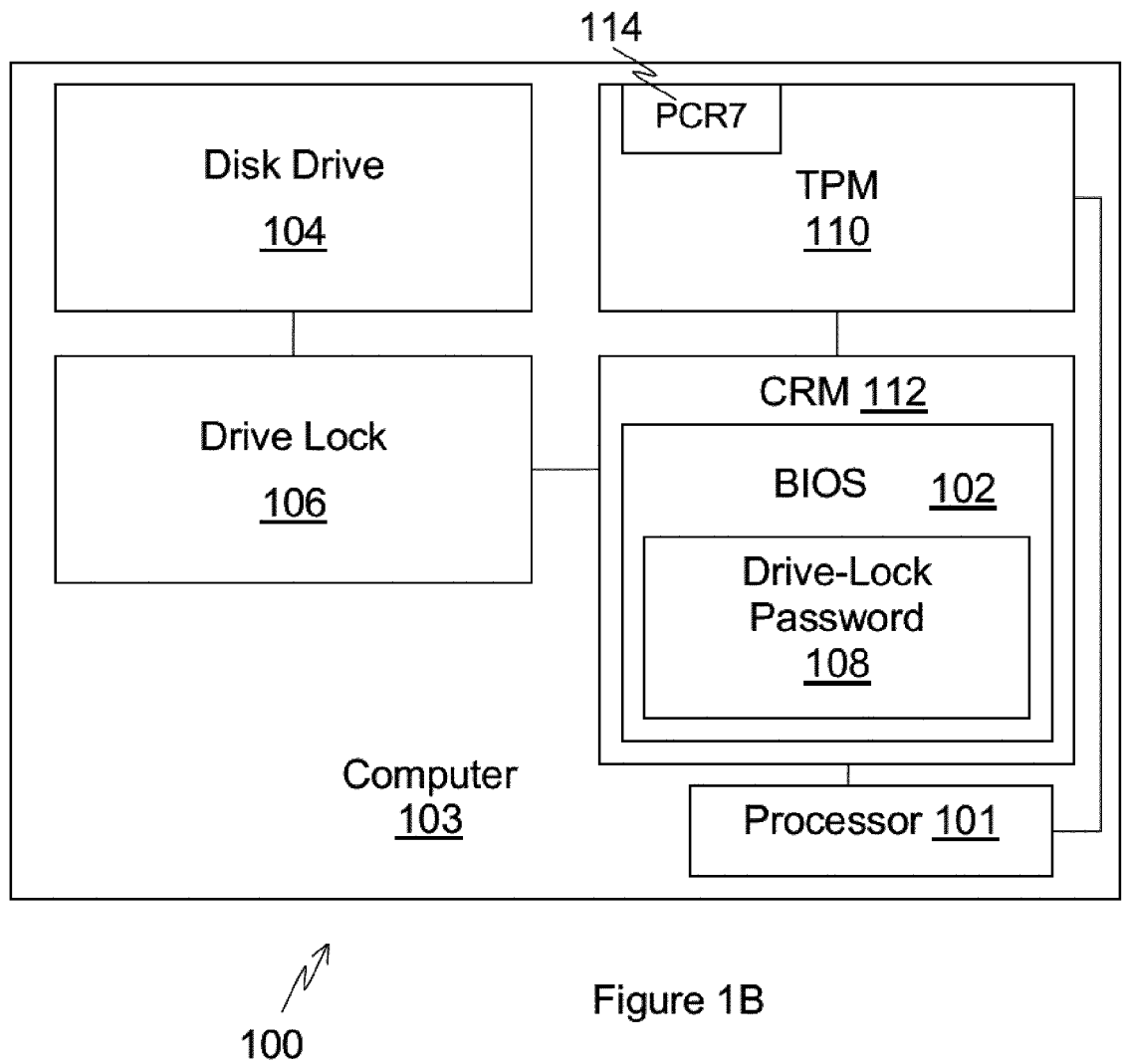
FIG. 1B shows a system of data security using a TPM in accordance with at least one embodiment of the present disclosure.

FIG. 1B shows a system of data security using a TPM in accordance with at least one embodiment of the present disclosure. The TPM 110 is a microprocessor, designed by the Trusted Computing Group, dedicated to cryptography. The TPM 110 generates cryptographic keys using a pseudo-random number generator. In at least one embodiment, the drive-lock password 108 is encrypted and decrypted as requested by the TPM 110 using such a key for further security. The key comprises information generated and interpretable by the TPM 110, such as an opaque binary large object ("BLOB").

Preferably, the key is symmetric and protected before being stored in BIOS 102 by performing the "exclusive or" function ("XOR") between the key and a register of the TPM 110. As illustrated, the register is Platform Configuration Register 7 ("PCR7") 114. To remove the protection, the protected key may be used as the input of another XOR function along with the value in PCR7 such that the output of the second XOR function will be the original key. Preferably, the BIOS 102 causes the value located in PCR7 114 to change before the operating system has access to PCR7 in order to strengthen security.

In at least one embodiment, the drive lock password 108 is sealed to the TPM 110 with PCR7 114 at configuration time. The PCR7 value at the time of the seal operation should reflect a value which indicates the success of user authentication. After registration, if a user wishes to access the disk drive 104, the BIOS 102 preferably requests the user's token. If user authentication is successful, the BIOS 102 extends one value to PCR7 114. If user authentication is unsuccessful, the BIOS 102 extends a different value to PCR7 114. Next, the BIOS 102 requests the TPM 110 to unseal the drive-lock password 108. Only if the PCR7 114 has the value indicating authentication was successful will the TPM 110 unseal and release the drive-lock password 108. Once unsealed by the TPM 110, the drive-lock password 108 is presented to drive lock 106 to allow accessibility to the disk drive 104. Next, the BIOS 102 extends a random value to the PCR7 114 to prevent the TPM 110 from performing any unseal operations to access the drive-lock password 108. Thus, security is further strengthened because the BIOS 102 the drive lock password 108 is only accessible at a specific stage in the boot process.

Figure 2:
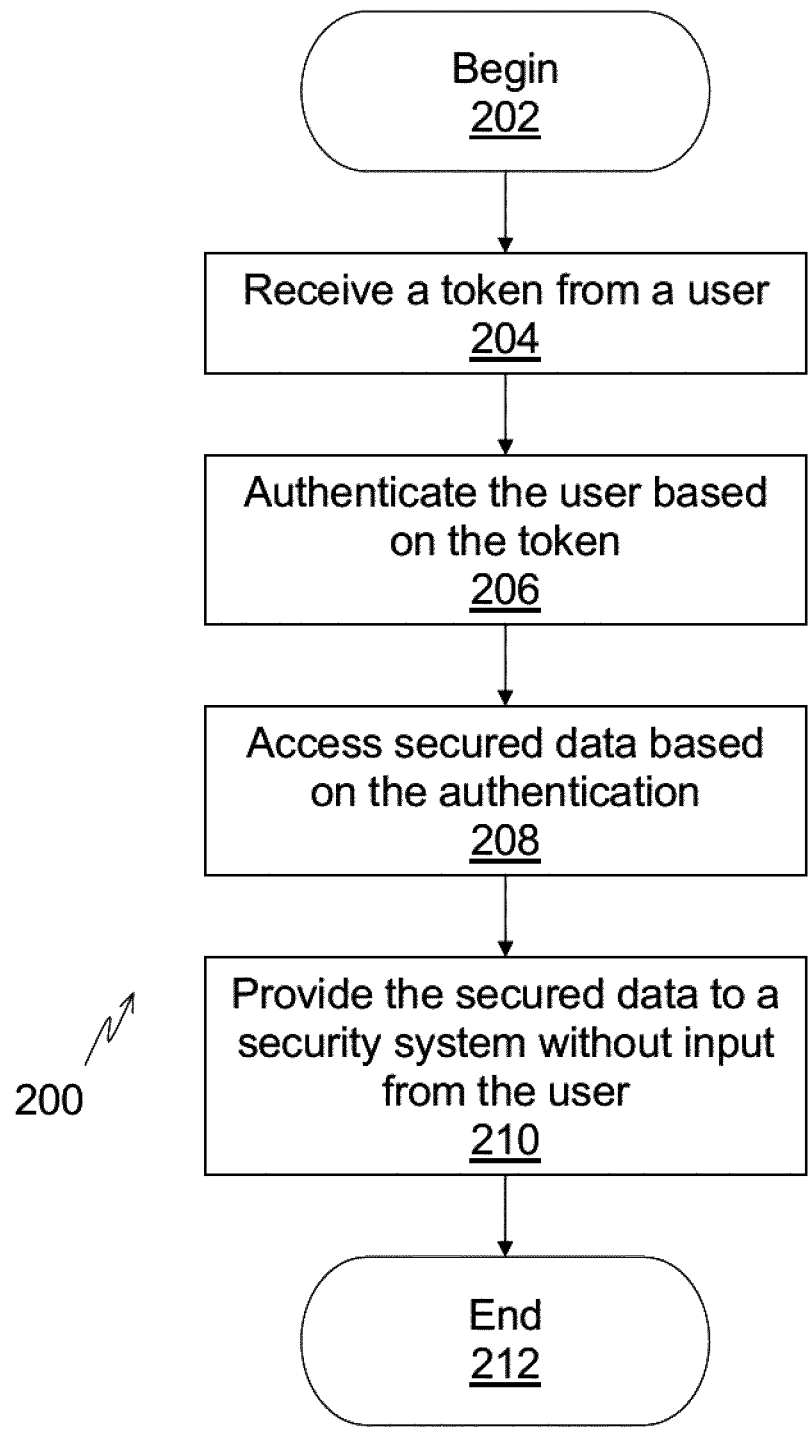
FIG. 2 shows a method of data security in accordance with at least one embodiment of the present disclosure.

FIG. 2 shows a method 200 of data security in accordance with at least one embodiment of the present disclosure. Beginning at 202 and ending at 212, the method comprises receiving a token from a user at 204. Each user has a different token. At 206, the user is authenticated based on the user's token. At 208, secured data is accessed based on the authentication, the secured data accessible for each authenticated user. At 210, the secured data is provided to a security system without input from the user. Preferably, providing the secured data comprises providing a drive-lock password to a drive-lock system without input from the user. Also, accessing the secured data comprises accessing the secured data encrypted by a TPM based on the authentication in at least one embodiment. Preferably, the secured data is accessible for each authenticated user out of the plurality of users. In at least one embodiment, accessing the secured data further comprises decrypting the secured data based on a hash of the token.

In various embodiments, a master drive-lock password allows access to a greater range of functions than a user drive-lock password, similar to the relationship between an administrator's operating system password and a user's operating system password. However, because the disclosure applies to both types of drive-lock passwords and the users of the computer 103 outnumber the available master and user drive-lock passwords combined, reference was made to a single drive-lock password for explanatory purposes. Additionally, those having ordinary skill in the art can implement the teachings of this disclosure to accommodate user drive-lock passwords as well as master drive-lock passwords.

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

What is claimed is:

1. A system, comprising:
 a basic-input-output-system ("BIOS") comprising a BIOS storage device;
 a disk drive; and
 a security system configured to prevent unauthenticated access to the disk drive;
 wherein, for each of at least two users out of a plurality of users, the BIOS
   encrypts secured data utilizing an encryption key to produce encrypted secured data;
   deletes the encryption key such that the encryption key is not stored on the BIOS storage device;
   stores the encrypted secured data;
   authenticates the user based on a token out of a plurality of tokens, each of the at least two users associated with a different token out of the plurality of tokens;
   accesses the secured data based on the authentication; and
   provides the secured data to the security system without input from the user; and
 wherein authenticating the user, accessing the secured data, and providing the secured data occur during power-on self-test ("POST").

2. The system of claim 1, wherein the security system is a drive-lock system and wherein the secured data is a drive-lock password.

3. The system of claim 1, wherein the token is selected from the group consisting of password, smart card, and fingerprint.

4. The system of claim 1, wherein the secured data is encrypted by a Trusted Platform Module ("TPM").

5. The system of claim 1, wherein the authentication obviates the user from presenting a password selected from the group consisting of BIOS password, power-on password, drive-lock password, and operating system password.

6. The system of claim 1, wherein the authentication obviates the user from presenting a BIOS password, a power-on password, a drive-lock password, and an operating system password.

7. The system of claim 1, wherein accessing the secured data further comprises decrypting the secured data based on a hash of the token.

8. The system of claim 2, wherein the BIOS generates the drive-lock password based on the plurality of tokens.

9. The system of claim 1, wherein the security system allows access to the disk drive based on the secured data.

10. A method, comprising:
 encrypting secured data utilizing an encryption key to produce encrypted secured data;
 deleting the encryption key such that the encryption key is not stored on a BIOS storage device;
 storing the encrypted secured data;
 authenticating each of at least two users (not simultaneously) out of a plurality of users based on a token out of a plurality of tokens, each of the at least two users associated with a different token out of the plurality of tokens;
 accessing for each of the at least two users (not simultaneously) the secured data based on the authentication; and
 providing for each of the at least two users (not simultaneously) the secured data to a security system without input from the user;
 wherein authenticating the user, accessing the secured data, and providing the secured data occur during power-on self-test ("POST").

11. The method of claim 10, wherein providing the secured data comprises providing a drive-lock password to a drive-lock system without input from the user.

12. The method of claim 10, wherein accessing the secured data comprises accessing for each of the at least two users (not simultaneously) the secured data based on the authentication, the secured data encrypted by a Trusted Platform Module ("TPM").

13. A non-transitory computer-readable medium storing software that, when executed by a processor, causes the processor to:
   encrypt secured data utilizing an encryption key to produce encrypted secured data;
   delete the encryption key such that the encryption key is not stored on a BIOS storage device;
   store the encrypted secured data;
   authenticate each of at least two users (not simultaneously) out of a plurality of users based on a token out of a plurality of tokens, each of the at least two users associated with a different token out of the plurality of tokens;
   access for each of the at least two users (not simultaneously) the secured data based on the authentication; and
   provide for each of the at least two users (not simultaneously) the secured data to a security system without input from the user;
   wherein authenticating the user, accessing the secured data, and providing the secured data occur during power-on self-test ("POST").

14. The non-transitory computer-readable medium of claim 13, wherein accessing the secured data comprises accessing for each of the at least two users (not simultaneously) the secured data based on the authentication, the secured data encrypted by a Trusted Platform Module ("TPM").

15. The system of claim 2, wherein the BIOS utilizes symmetric encryption to encrypt the drive-lock password based on a hash of a token of the plurality of tokens.

16. The system of claim 4, wherein the secured data is sealed to the TPM with a platform configuration register at time of configuration.

17. The method of claim 11, further comprising encrypting the drive-lock password utilizing symmetric encryption based on a hash of a token of the plurality of tokens.

18. The method of claim 12, further comprising sealing the secured data to the TPM with a platform configuration register at time of configuration.

19. The non-transitory computer-readable medium of claim 13, wherein the software further causes the processor to encrypt a drive-lock password utilizing symmetric encryption based on a hash of a token of the plurality of tokens.

20. The non-transitory computer-readable medium of claim 14, wherein the software further causes the processor to seal the secured data to the TPM with a platform configuration register at time of configuration.

21. The system of claim 1, wherein the BIOS further re-generates the encryption key and decrypts the encrypted secured data utilizing the re-generated encryption key.

* * * * *